G. F. STEEDMAN.
UNLOADING VALVE FOR COMPRESSORS.
APPLICATION FILED JAN. 29, 1916.
1,215,071.
Patented Feb. 6, 1917.
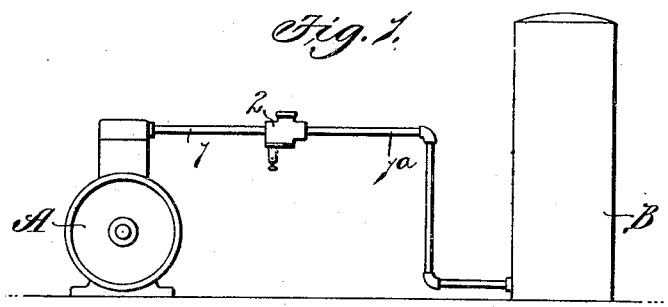
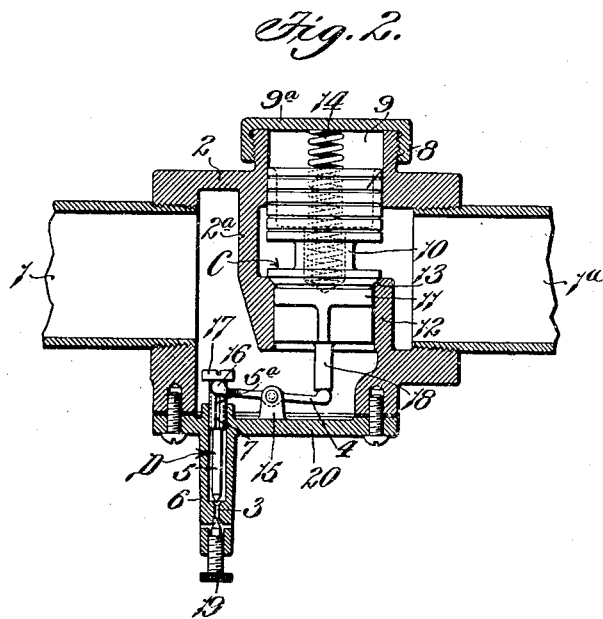
Inventor,
George F. Steedman.
By Bakewell & Cornwall attys.

UNITED STATES PATENT OFFICE.

GEORGE F. STEEDMAN, OF ST. LOUIS, MISSOURI, ASSIGNOR TO CURTIS & CO. MFG. CO., OF WELLSTON, MISSOURI, A CORPORATION OF MISSOURI.

UNLOADING-VALVE FOR COMPRESSORS.

1,215,071. Specification of Letters Patent. Patented Feb. 6, 1917.

Application filed January 29, 1916. Serial No. 75,067.

*To all whom it may concern:*

Be it known that I, GEORGE F. STEEDMAN, a citizen of the United States, residing at St. Louis, Missouri, have invented a certain new and useful Improvement in Unloading-Valves for Compressors, of which the following is a full, clear, and exact description, such as will enable others skilled in the art to which it appertains to make and use the same.

This invention relates to an unloading device for air or gas compressors, operating in the discharge pipe thereof, and which automatically unloads a portion of the discharge pipe adjacent to the compressor whenever the compressor stops its compressing action, thereby facilitating the starting up of the compressor against pressure in the mains or tank beyond the unloading device, which the compressor is supplying.

In my Patent No. 686,778, of November 19, 1901, I show an unloading device operating in the discharge valve of a compressor and which is actuated by change in pressure in the reservoir or mains, but this application refers to a device which is actuated by the variation in the flow of gas or air through the device.

It has been common practice to place a check valve between the air compressor and the storage tank, and provide a leak orifice in the pipe between the check valve and the compressor, so that whenever the compressor stops, the check valve will close and the leak orifice unload the portion of pipe between the check valve and the compressor. This method is most objectionable, however, as the leak orifice is leaking whenever the compressor is operating, greatly reducing the efficiency of the compressor. The purpose of my invention is to automatically open such a leak orifice whenever the compressor stops its compressing action, and to close it automatically when the normal flow of gas or air through the pipe is resumed.

I am aware that similar unloading devices are successfully in use on water pumps, but same are not commercially applicable for use on air pumps, and it is the purpose of my invention to make an unloading device which is practical and commercial for gas or air compressors.

Another object of my invention is to provide a device which requires no close adjustment nor particularly fine workmanship or attention to operate successfully, so that my device will give service to the general public.

And still another object of my invention is to provide an automatic unloading device which can be easily and quickly adjusted, so as to accurately regulate the close of the relief valve and closing of the check valve, after the compressor starts to operate, thus enabling the device to be used with compressors of different capacities. Other objects and desirable features of my invention will be hereinafter pointed out.

Figure 1 of the drawings is a side elevational view of an apparatus constructed in accordance with my invention; and Fig. 2 is a longitudinal sectional view of the valve structure arranged in the discharge pipe leading from the compressor of said apparatus.

Referring to Fig. 1 of the drawings, A designates a compressor of any suitable type that is connected by means of a discharge pipe 1 to the storage tank B. A valve structure of the kind illustrated in Fig. 2 is arranged in the discharge pipe 1 between the compressor A and the storage tank B, so as to automatically unload the discharge pipe when the compressor ceases to operate. Said valve structure comprises a body portion 2 provided at its opposite ends with threaded openings for receiving the discharge pipes 1 and 1$^a$ and having a partition 2$^a$ which divides the interior of said body portion into two separate compartments or chambers. A check valve C is arranged in said partition so as to cut off communication between the two compartments or chambers of the valve body when the compressor A ceases to operate, and a relief valve or unloading valve D is arranged in said body portion 2 at a point between the check valve and the compressor, so as to automatically unload the discharge pipe after the compressor A has stopped, or when the check valve C is on its seat. When the compressor A is in normal operation the relief valve D is closed and the check valve C is open, thereby permitting the medium compressed by the compressor to flow through the discharge pipe into the storage tank B without any escaping through the port or orifice that the relief valve D controls. When the compressor ceases to operate the check valve C acts automatically, to prevent the pressure in the storage tank from backing up into the compressor, and a means then becomes operative for causing the relief valve D to open so as to permit the compressed medium in that portion of the discharge pipe 1 between the compressor and the check valve C to escape. It is immaterial, so far as my invention is concerned, what particular type of relief valve is used, but I prefer to use a needle valve that controls a discharge port or orifice 3, said valve being opened automatically by means of an operating device 4 that is actuated by the check valve C. The stem 5 of the relief valve D is reciprocatingly mounted in the body portion 6 of said valve and adjacent the upper end of said stem is an enlarged portion 5ª in which one or more grooves 7 are formed, so as to permit the medium in the discharge pipe 1 to flow through said grooves and escape through the orifice 3 when the stem 5 of the relief valve is raised, as shown in Fig. 2. When the relief valve D is closed the conical portion at the lower end of the stem 5 thereof fits snugly in the tapered seat in the upper side of the discharge orifice 3, and thus effectively closes said orifice. It is also immaterial, so far as my broad idea is concerned, what particular type of check valve is used, but I prefer to use a valve C that comprises a piston portion 8 which fits snugly in a cylinder 9 in the body portion 2 of the valve structure, said piston portion being connected to the valve C by a reduced portion or shank 10. On the underside of the valve C is a distinct piston portion 11 that reciprocates in an open-ended sleeve 12 that forms part of the transverse dividing wall or partition in the body portion 2 of the valve structure, said sleeve being beveled at its upper end, as shown in Fig. 2, so as to form a seat 13 for the valve C. When the compressor A is in normal operation the check valve C is held from its seat by the pressure of the medium that flows through the discharge pipe 1, the piston portion 8 of the check valve C acting to dampen the movement of said valve and tending to prevent it from fluctuating between impulses of the compressor A. The piston portion 8 and its cylinder 9 comprise what is ordinarily known as a dash pot. I prefer to use a valve with a dash pot, as it insures longer life to the device, and noiseless operation, but the dash pot is not essentially necessary to the successful operation of the device. The dash pot, if used, may be placed where convenient.

When the compressor ceases its compressing action the weight of the valve C moves said valve downwardly toward its seat, but if desired, a spring 14 can be arranged between the valve C and a removable cap 9ª that forms the upper end of the cylinder 9, so as to cause the check valve C to seat quickly, the lower end of said spring fitting in a socket or bore in the reduced shank 10 on the upper side of the valve C, as shown in dotted lines in Fig. 2. The device 4 that opens the relief valve D preferably consists of a lever pivotally mounted on a stationary bracket 15 and provided at one end with a bifurcated portion 16 that straddles the stem of the relief valve D and bears against the underside of a head 17 at the upper end of said stem. The opposite end of the lever 4 is arranged in such a position that it will be engaged by a depending shank or stem 18 on the piston portion 11 of the check valve C when said valve moves toward its seat, after the compressor A ceases to operate. In order that my improved valve structure may be used with compressors of different capacity, I have provided the relief valve D with an adjustable device 19 arranged in the lower end of the body portion 6 of same for regulating the discharge through the orifice 3. By changing the position of the device 19 the rate of flow through the discharge orifice 3 when the compressor A is started can be varied so as to accurately regulate the time of opening the check valve C and the time of closing the relief valve. In other words, the device 19 makes it possible to accurately adjust the valve structure so that the check valve C will not open and the relief valve D will not close until after the compressor has acquired sufficient speed to produce sufficient pressure to force the check valve from its seat. On the underside of the body portion 2 of the valve is a removable cap 20 that carries the relief valve D and the bracket 15 on which the operating lever 4 for the relief valve is mounted.

When the compressor A is in operation the check valve C occupies such a position that the depending stem 18 on the piston portion 11 of same does not engage the relief valve operating lever 4, thus permitting the relief valve to be held seated by the internal pressure in the hollow body portion 2 of the valve structure, or by any other suitable means, and consequently, preventing the medium flowing through the discharge pipe 1 from escaping through the unloading orifice 3. When the compressor A stops, the check valve C moves toward its seat and causes the depending stem 18 thereon to exert sufficient pressure on the lever 4 to automatically unseat the relief valve, and thus open the orifice 3. When the check valve C moves toward its seat, the piston portion 11 on the underside of same enters the open-ended sleeve 12 and entirely, or almost entirely, cuts off communication between the two chambers in the body portion 2 of the valve structure before the check valve C engages its seat 13 and before the lever 4 unseats the relief valve D. Consequently, there is no possibility of the compressed medium in the storage tank B and the portion of the discharge pipe 1ª between the valve structure and the storage tank B backing up and escaping through the unloading orifice 3 when the compressor stops, owing to the fact that the relief valve D is not opened until after communication has been cut off between the two chambers in the body portion 2 of the valve structure. In other words, the check valve is so constructed that communication between the relief valve and the storage tank is cut off entirely, or almost entirely, before the check valve moves toward its seat sufficiently to cause the relief valve to open. The relief valve D opens quickly and remains in its open position so long as the check valve C remains seated, thus permitting the pressure to escape from the portion of the discharge pipe 1 between the compressor and the check valve C. When the compressor is thereafter started the check valve C remains seated and the relief valve D remains open until the compressor has acquired sufficient speed to create sufficient pressure in the discharge pipe to overcome the force that holds the check valve seated. Some of the medium of course escapes through the discharge orifice 3 when the compressor is being started, but as soon as the pressure becomes great enough to unseat the check valve C, the relief valve D closes, and thus automatically cuts off the escape of the medium through the unloading orifice 3.

The piston portion 11 beneath the valve seat 13 of the check valve C insures a considerable aptitude of vertical motion to the check valve C, so that there is no refinement of adjustment necessary between the valve C and the lever 4, and reasonable wear to the different parts does not, therefore, affect the proper sequence of operations.

The piston portion 11 also makes it possible for a large size relief valve, built according to my invention, to operate successfully on a relatively small compressor, as the piston portion 11 insures a considerable vertical travel to the valve C, irrespective of the volume of air passing by the valve C. In other words, the piston portion 11 determines the minimum travel of the valve C.

When I speak of the compressor stopping, I intend to convey the thought that the compressor shall either stop entirely or slow down considerably below its normal rate of operation, thereby causing a considerably less volume of air to pass through the relief valve than does under normal operating condition of the compressor. I wish it also understood that when I speak of air in the claims that I mean either air or any other gas. When I speak of an unloading valve for the discharge line, I mean that portion of the discharge line between the check valve and the compressor.

Having thus described my invention, what I claim and desire to secure by Letters Patent, is:

1. In an apparatus of the character described, the combination of a compressor, a storage tank, a check valve arranged in the discharge line from said compressor, an unloading valve for said discharge line, said valves being arranged out of alinement with each other, means for cutting off the flow of the medium in said discharge line when the compressor stops, and means controlled by said check valve for causing said unloading valve to open automatically before said check valve seats.

2. In an apparatus of the character described, the combination of a compressor, a storage tank, a check valve arranged in the discharge line from said compressor, an unloading valve for said discharge line, said valves being arranged out of alinement with each other, means for cutting off the flow of the medium in said discharge line when the compressor stops, means controlled by said check valve for causing said unloading valve to open automatically before said check valve seats, and means for regulating the discharge of the medium from said unloading valve.

3. In an apparatus of the character described, the combination of a compressor, a check valve arranged in the discharge line from said compressor, an unloading valve adapted to unload the discharge line between the compressor and the check valve, means for cutting off the flow of the medium through the discharge line when the check valve is near its seat, a dampening means combined with said check valve to prevent its rapid movement to and from its seat, and means controlled by said check valve for causing said unloading valve to open automatically before said check valve seats but after the flow of the medium through the discharge line has ceased.

4. In an apparatus of the character described, the combination of a compressor, a check valve arranged in the discharge line from said compressor, an unloading valve adapted to unload the discharge line between the compressor and the check valve, means for cutting off the flow of the medium through the discharge line when the check valve is near its seat, and means controlled by said check valve for causing said unloading valve to open automatically before said check valve seats.

5. In an apparatus of the character described, the combination of a compressor, a check valve arranged in the discharge line from said compressor, an unloading valve adapted to unload the discharge line between the compressor and the check valve, means for cutting off the flow of the medium through the discharge line when the check valve is near its seat, a dampening means combined with said check valve to prevent its rapid movement to and from its seat, means controlled by said check valve for causing said unloading valve to open automatically before said check valve seats but after the flow of the medium through the discharge line has ceased, and means for regulating the discharge of the medium from said unloading valve.

6. An unloading check valve for air compressors, comprising a body portion, a partition that divides said body portion into a receiving compartment and a discharge compartment, said partition having an aperture provided with a check valve seat arranged adjacent the discharge compartment and a piston valve sleeve arranged adjacent the receiving compartment, a check valve operating in the aperture in said partition and provided with a piston valve portion arranged in the sleeve in said partition, a dampening piston portion arranged on the discharge side of said check valve, a dampening cylinder arranged in alinement with said check valve that receives the said dampening piston portion and thus prevents rapid movement of the check valve, and an unloading valve with a restricted opening in the receiving compartment, said unloading valve being operated by the motion of the check valve and being so arranged that the unloading valve is inoperative when the piston valve portion on the check valve is out of its seat and operative when said check valve is seated.

7. A valve structure, comprising a body portion provided with a partition that divides the interior of same into two compartments, said partition having an open-ended sleeve, a check valve having a cylindrical portion that fits in said sleeve, a piston portion on said check valve that fits in a cylinder in said body portion, a spring that exerts pressure on said check valve in a direction tending to hold it seated, a relief valve that controls a discharge orifice leading from one of said compartments, and a lever interposed between said valves for effecting the opening of said relief valve.

8. A valve structure, comprising a body portion provided with a partition that divides the interior of same, into two compartments, said partition having an open-ended sleeve, a check valve having a cylindrical portion that fits in said sleeve, a piston portion on said check valve that fits in a cylinder in said body portion, a relief valve that controls a discharge orifice leading from one of said compartments, said relief valve consisting of a stem that is reciprocatingly mounted in a body portion in which said discharge orifice is formed, an adjustable device for regulating the discharge of the medium through said orifice, and an operating device for said relief valve that is adapted to be engaged by a portion on said check valve.

In testimony whereof I hereunto affix my signature in the presence of two witnesses, this 24th day of January 1916.

GEORGE F. STEEDMAN.

Witnesses:
L. L. BUCKLES,
J. F. D. HOWELL.

Copies of this patent may be obtained for five cents each, by addressing the "Commissioner of Patents, Washington, D. C."